United States Patent
Colson et al.

(10) Patent No.: US 9,914,542 B2
(45) Date of Patent: Mar. 13, 2018

(54) RAM AIR FAN HOUSING

(71) Applicant: Hamilton Sundstrand Corporation, Windsor Locks, CT (US)

(72) Inventors: Darryl A. Colson, West Suffield, CT (US); William R. Fiske, Springfield, MA (US); Paul E. Hamel, Enfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1135 days.

(21) Appl. No.: 14/053,223

(22) Filed: Oct. 14, 2013

(65) Prior Publication Data
US 2015/0104302 A1    Apr. 16, 2015

(51) Int. Cl.
| | |
|---|---|
| *F04D 29/60* | (2006.01) |
| *B64D 13/08* | (2006.01) |
| *F04D 19/00* | (2006.01) |
| *F04D 25/06* | (2006.01) |
| *F04D 29/58* | (2006.01) |
| *F04D 29/64* | (2006.01) |
| *B64D 13/06* | (2006.01) |
| *H02K 9/06* | (2006.01) |

(52) U.S. Cl.
CPC .............. *B64D 13/08* (2013.01); *B64D 13/06* (2013.01); *F04D 19/00* (2013.01); *F04D 25/0606* (2013.01); *F04D 29/5806* (2013.01); *F04D 29/644* (2013.01); *H02K 9/06* (2013.01); *B64D 2013/0618* (2013.01); *B64D 2013/0644* (2013.01); *Y02T 50/56* (2013.01)

(58) Field of Classification Search
CPC .... F04D 29/522; F04D 29/526; F04D 29/644; F04D 29/646; F04D 25/06; F04D 25/0606; F04D 13/0606; F04D 13/06; F04B 17/03
See application file for complete search history.

(56) References Cited

U.S. PATENT DOCUMENTS

2006/0078429 A1*  4/2006  Darkins, Jr. .............. F01D 9/04
                                                      415/209.2
2012/0014784 A1*  1/2012  Hipsky .................. B64D 13/00
                                                      415/177

FOREIGN PATENT DOCUMENTS

| CN | 102782333 A | 11/2012 |
|---|---|---|
| EP | 1645725 A1 | 4/2006 |
| EP | 2409919 A2 | 1/2012 |
| JP | 2012057619 | 3/2012 |
| KR | 20020030621 A | 4/2002 |

OTHER PUBLICATIONS

Chinese Office Action Issued in CN Application No. 201410542145.4, Dated Aug. 24, 2017, 7 pages.

* cited by examiner

*Primary Examiner* — Woody Lee, Jr.
*Assistant Examiner* — Maxime Adjagbe
(74) *Attorney, Agent, or Firm* — Cantor Colburn LLP

(57) ABSTRACT

A fan housing of a ram air fan assembly is provided including a flange having at least one tab. The at least one tab includes a first portion extending generally perpendicularly from the flange and a second portion extending generally parallel to the flange. A notch is formed by an inclined surface and a curved surface at an intersection between the first portion and the second portion. The second portion is elongated and extends about 0.020 inches beyond a front surface of the first portion.

15 Claims, 3 Drawing Sheets

RAM AIR FAN HOUSING

BACKGROUND OF THE INVENTION

Embodiments of the present invention generally relate to an environmental control system for an aircraft and, more particularly, to cooling a ram air fan motor for the environmental control system of an aircraft.

An environmental control system (ECS) aboard an aircraft provides conditioned air having a desirable temperature, pressure, and humidity for aircraft passenger comfort and safety to an aircraft cabin. When the aircraft is at or near ground level, the ambient air temperature and/or humidity is often sufficiently high that the air must be cooled as part of the conditioning process before being delivered to the aircraft cabin. At flight altitude, however, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that may come from a ram air system and that is referred to as ram air herein. The ram air flows into the ECS, across heat exchangers in the ECS, and out of the aircraft, carrying the excess heat with it. Under conditions where the aircraft is moving fast enough, the pressure of the ram as it enters the aircraft is sufficient to move enough air through the ECS and over the heat exchangers to remove the excess heat.

While ram air works well under normal flight conditions, at lower flight speeds, or when the aircraft is on the ground, the ram air pressure is too low to provide enough air flow across the heat exchangers for sufficient heat removal from the ECS. Under these conditions, a fan within the ECS is employed to provide the necessary airflow across the ECS heat exchangers. The fan is driven by an electric motor which, in turn, must also be cooled by air flowing across it. Cooling flow is drawn from a heat exchanger inlet and across the electric motor to the ram fan inlet.

BRIEF DESCRIPTION OF THE INVENTION

According to one embodiment of the invention, a fan housing of a ram air fan assembly is provided including a flange having at least one tab. The at least one tab includes a first portion extending generally perpendicularly from the flange and a second portion extending generally parallel to the flange. A notch is formed by an inclined surface and a curved surface at an intersection between the first portion and the second portion. The second portion is elongated and extends about 0.020 inches beyond a front surface of the first portion.

According to another embodiment of the invention, a ram air fan assembly is provided including a fan housing having a flange including at least one tab. The at least one tab includes a first portion extending generally perpendicularly from the flange and a second portion extending generally parallel to the flange. A notch is formed by an inclined surface and a curved surface at an intersection between the first portion and the second portion. The second portion is elongated and extends about 0.020 inches beyond a front surface of the first portion. A motor stator is positioned within the fan housing such that an end of the motor stator is located within the notch of the at least one tab.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described above, the motor that drives a ram air fan is typically cooled by ram air. Supports used to control the position of the motor limit the path of the cooling air around the motor. As a result, heat dissipation from the motor is obstructed, thereby resulting in reduced performance of the ram air flow system. Embodiments disclosed herein may provide for a reduction in air obstruction.

Figure 1:
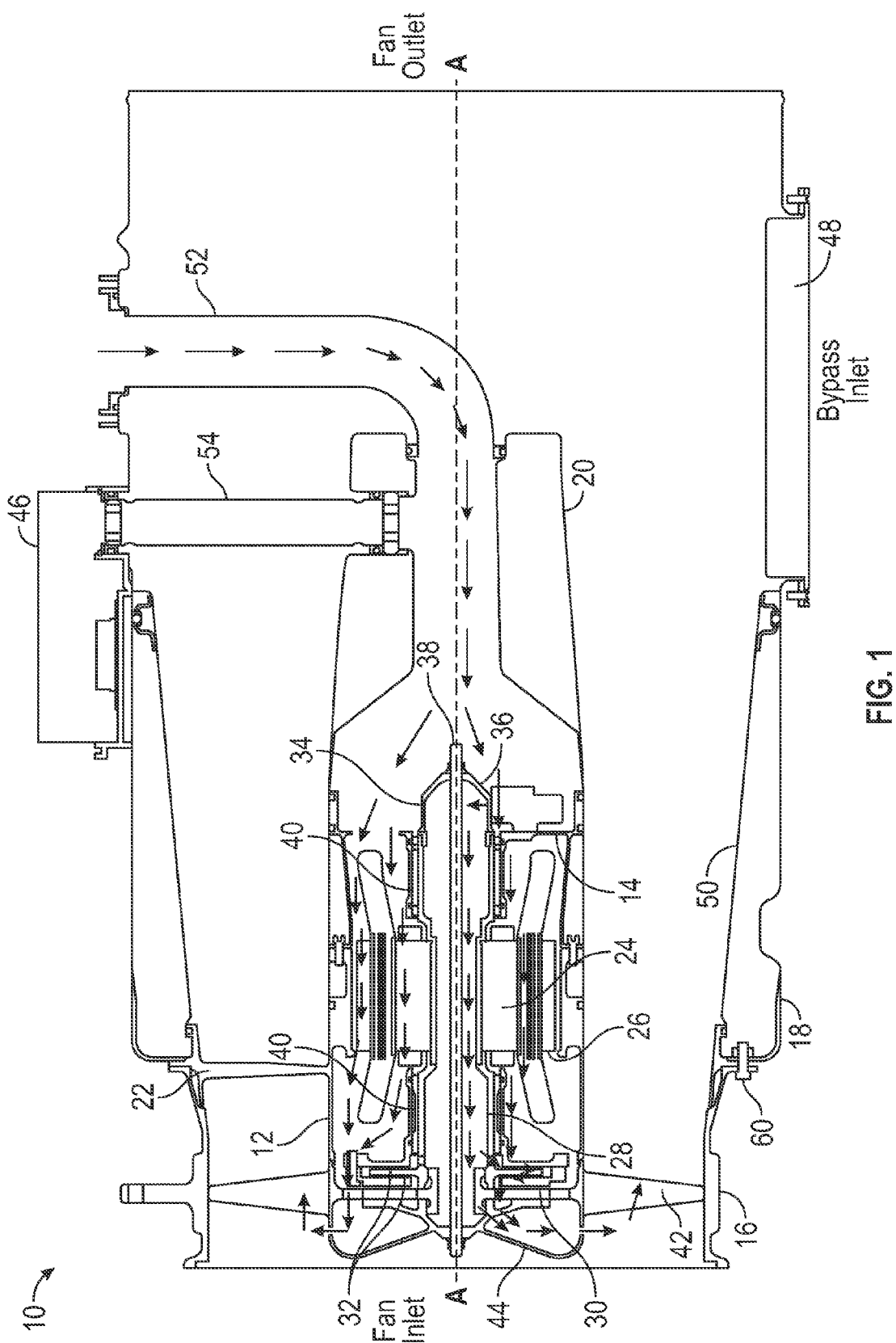
FIG. 1 is a schematic drawing of an exemplary air unit.
Figure 2:
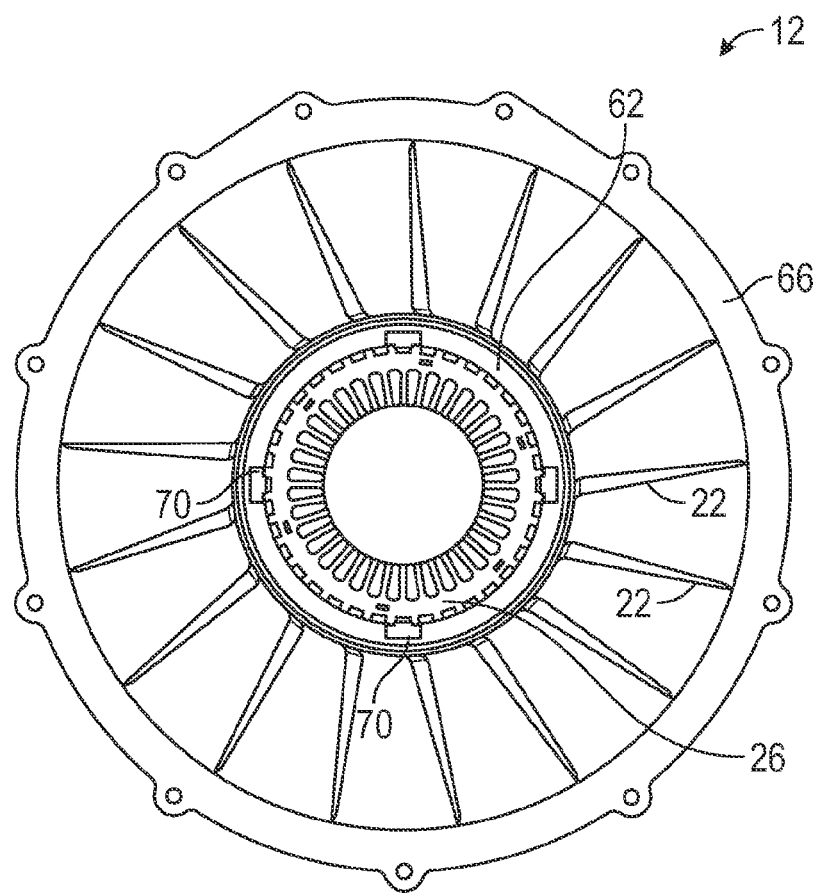
FIG. 2 is a front view of a fan housing according to an embodiment of the invention.

Referring now to FIG. 1, the illustrated ram air fan assembly 10 includes a fan housing 12, bearing housing 14, inlet housing 16, outer housing 18, inner housing 20, and a plurality of bolts 60. The fan housing 12 includes fan struts 22, motor rotor 24, motor stator 26, thrust shaft 28, thrust plate 30 and thrust bearings 32. Bearing housing 14 includes journal bearing shaft 34 and shaft cap 36. Together, the fan housing 12 and the bearing housing 14 include tie rod 38 and journal bearings 40. The inlet housing 16 contains fan rotor 42 and inlet shroud 44, in addition to a portion of tie rod 38. The outer housing 18 includes terminal box 46 and plenum 48. Within the outer housing 18 are diffuser 50, motor bearing cooling tube 52, and wire transfer tube 54. A fan inlet provides a source of air to be moved the ram air fan assembly 10 in the absence of sufficient ram air pressure, for example when the aircraft is at a low altitude or on the ground. A bypass inlet provides a source of air that moves through the ram air fan assembly 10 when sufficient ram air pressure is available.

In the illustrated, non-limiting embodiment, the inlet housing 6 is connected to a fan inlet and the outer housing 18 is connected to a fan outlet. The inlet housing 16 and the outer housing 18 are attached to fan housing 12 at fan struts 22 by a plurality of bolts 60. The bearing housing 14 is attached to the fan housing 12 and the inner housing 20 connects the motor bearing cooling tube 52 and the wire transfer tube 54 to the bearing housing 14. The motor bearing cooling tube 52 connects the inner housing 20 to a source of cooling air at the outer housing 18. The wire transfer tube 54 couples the inner housing 20 to the terminal box 46. Motor stator 26 and thrust plate 30 attach to the fan housing 12. The motor rotor 24 is contained within the stator 26 and connects the journal bearing shaft 34 to the thrust shaft 28.

Together, the journal bearing shaft 34, motor rotor 24, and thrust shaft 28 define an axis of rotation A for the ram air fan assembly 10. Fan rotor 42 is attached to the thrust shaft with tie rod 38 extending along the axis of rotation A from the shaft cap 36 at the end of the journal bearing shaft 34, through motor rotor 24, thrust shaft 28, and fan rotor 42 to the inlet shroud 44. The thrust bearings 32 are positioned between a flange-like portion of the thrust shaft 28 and thrust plate 30 and between the flange-like portion of the thrust shaft 28 and fan housing 12. Journal bearings 40 are position between the journal bearing shaft and the bearing housing 14 and between the thrust shaft 28 and the fan housing 12. The inlet shroud 44, fan rotor 42, and a portion of the fan housing 12 are contained within the inlet housing 16. The inlet housing 16 is connected to a fan inlet and the outer housing 18 is connected to a fan outlet.

In operation, the ram air fan assembly 10 is installed into an environmental control system (ECS) of an aircraft. In instances when the aircraft is not moving fast enough to generate sufficient ram air pressure to meet the cooling needs of the ECS, power is supplied to the motor stator 26 by wires running from terminal box 46 through the wire transfer tube 54, inner housing 20, and bearing housing 14. The energized motor stator 26 causes the motor rotor 24, and therefore the fan rotor 42 and the inlet shroud 44, to rotate about the axis of rotation A. As the fan rotor 42 rotates, air moves from the fan inlet, through the inlet housing 20, past the fan struts 22 and into the space between the fan housing 12 the outer housing 18. As the moves from the outer housing 18 through the inner housing 20 to the fan outlet, the shape of the diffuser 50 and the inner housing 18 reduces the air pressure.

Components within the bearing housing 14 and fan housing 12, especially the thrust bearings 32, journal bearings 40, motor stator 26, and motor rotor 24 generate significant heat and must be cooled. Cool air is provided by the motor bearing cooling tube 52 which directs a flow of cool air through the inner housing 20. From the inner housing 20, the air enters the bearing housing 14 and the fan housing 12 flows over the associated components to remove heat therefrom. When the velocity of the aircraft is fast enough to generate sufficient ram air pressure to meet the cooling needs of the ECS, ram air is directed into plenum 48 from the bypass inlet.

Figure 3:
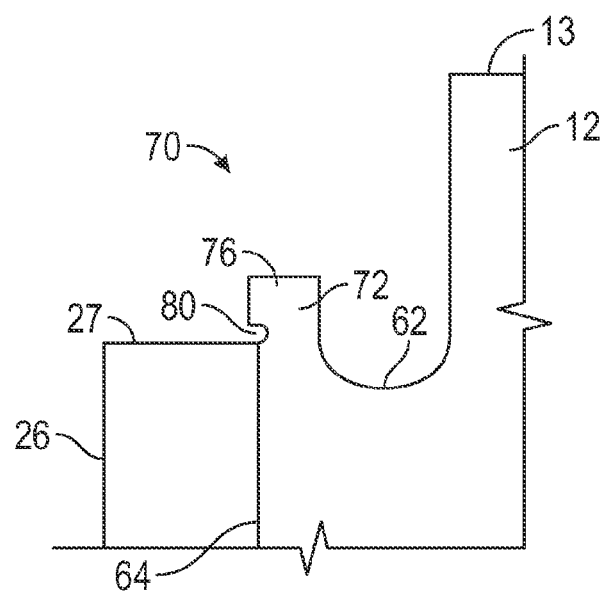
FIG. 3 is a cross-sectional view of a portion of the fan housing according to an embodiment of the invention.
Figure 4:
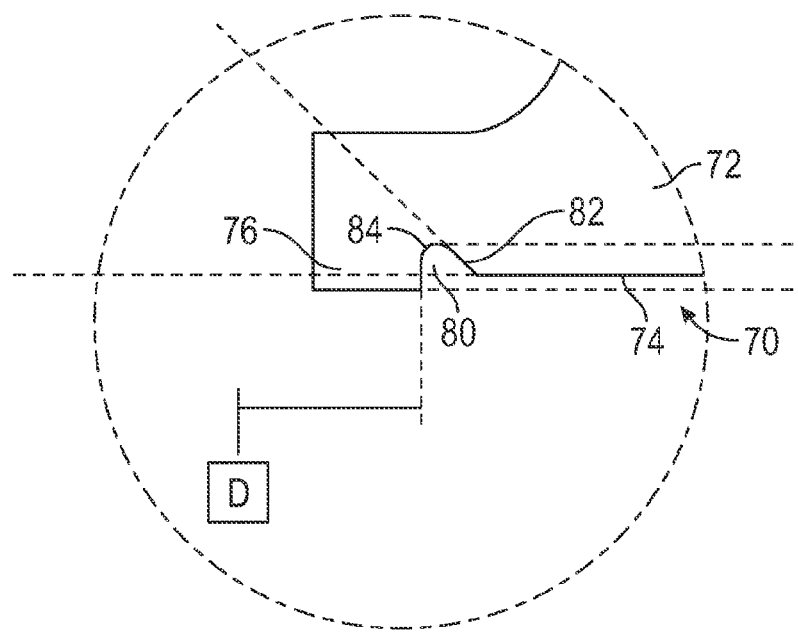
FIG. 4 is an enlarged cross-sectional view of a tab of the fan housing according to an embodiment of the invention.
Figure 5:
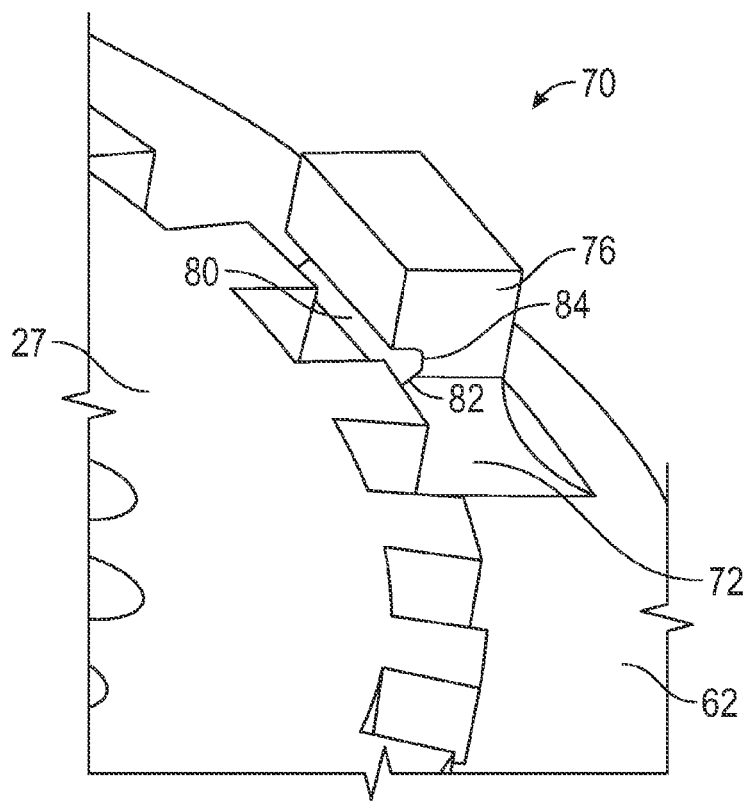
FIG. 5 is a perspective view of a portion of the fan housing according to an embodiment of the invention.

Referring now to FIGS. 2-5, a portion of the fan housing 12 is illustrated in more detail. The fan housing 12 includes a flange 62 generally parallel to an end 27 of the motor stator 26. In one embodiment, the integrally formed flange 62 is arranged near a first end 13 of the fan housing 12, such as the end closest to the fan inlet for example. Extending generally perpendicularly from the flange 62 towards the fan inlet is at least one tab 70. In the illustrated, non-limiting embodiment, the flange includes four tabs. In embodiments having a multiple tabs, each tab 70 is substantially identical and the plurality of tabs 70 may be spaced randomly or equidistantly about the circumference of the flange 62. In addition, the tabs 70 may be coupled to the flange 62, such as with an adhesive for example (FIG. 5), or may be integrally formed as a portion of the flange 62 and the fan housing 12 (FIG. 3).

Each tab 70 includes a first portion 72 extending generally perpendicular to the flange 62 and a second portion 76 extending from the first portion 72 in a direction generally parallel to the flange 62. The second portion 76 is arranged at the free end of the first portion 72. A notch or opening 80 is located at the intersection between the first portion 72 and the second portion 76 closest to the motor stator 26. The notch 80 includes and inclined surface 82 connected to a curved surface 84 (see FIG. 5). In one embodiment, the inclined surface 82 extends at an angle greater than or equal to about 45 degrees from the front surface 74 of the first portion 72, and the curved surface 84 has a radius of about 0.020 inches (0.0508 centimeters). The depth of the notch 80 is generally defined by the distance that the inclined surface 82 extends perpendicular to the front surface 74 of the first portion 72. In one embodiment, the depth of the notch 80 is about 0.035 inches±0.005 inches (0.089 centimeters±0.0127 centimeters).

In one embodiment, the front surface 74 of the first portion 72 of the tab 70 is generally aligned or integrally formed with an inner surface 64 of the flange 62 (see FIG. 3). The first portion 72 extends outwardly from the flange 62 such that end 27 of the motor stator 26 is generally arranged within the notch 80. A distance from the second portion 76 of the tab 70 adjacent the notch 80 may be measured to a datum D, such as to a bolt flange 66 extending from the outer periphery of the struts 22 of the fan housing 12 (see FIG. 2) for example. In one embodiment, the distance from the second portion 76 of the tab 70 adjacent the notch 80 to a defined datum D is about 0.250 inches (0.635 centimeters). The second portion 76 of the tab 70 is elongated relative to the first portion 72 and extends in a direction towards the center of the motor stator 26. The elongated second portion 76 is configured to limit axial movement of the motor stator 26 in the direction of the fan inlet and therefore extends beyond an outer circumference of the motor stator 26. In one embodiment, the second portion 76 extends an additional 0.020 inches (0.0508 centimeters) towards the center of the motor stator 26 beyond the first portion 72 of the tab 70.

Because the tabs 70 are not in direct contact with the end 27 of the motor stator 26, the cooling flow may pass around the back iron of the stator 26 by flowing through opening formed by the notch 80 in each tab 70. As a result, the heat generated by application of a current to the motor stator 26 will be dissipated more quickly, thus improving the performance and lifetime of the ram air fan assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fan housing configured to receive a motor stator for a ram air fan assembly, the housing comprising:
    a flange parallel to an end of the motor stator; the flange having at least one tab, the at least one tab including an axially-extending first portion extending generally perpendicularly from the flange and a radially-extending second portion extending generally parallel to the flange and a notch formed by an inclined surface extending radially outwardly from a front surface of the first portion and a curved surface connecting the inclined surface to the second portion, wherein the second portion is elongated and extends 0.020 inches (0.0508 centimeters) beyond the front surface of the first portion.

2. The fan housing according to claim 1, wherein the second portion of the tab adjacent the notch is a distance of 0.250 inches (0.635 centimeters) from a datum aligned with a bolt flange of the fan housing.

3. The fan housing according to claim 1, wherein the inclined surface of the notch extends at an angle of at least 45 degrees from the front surface of the first portion of the tab.

4. The fan housing according to claim 1, wherein the curved surface has a radius of 0.020 inches (0.0508 centimeters).

5. The fan housing according to claim 1, wherein the distance that the inclined surface extends perpendicular to the front surface of the first portion is 0.035 inches±0.005 inches (0.089 centimeters±0.0127 centimeters).

6. The fan housing according to claim 1, wherein the first portion of the tab is integrally formed with the flange.

7. The fan housing according to claim 1 wherein the front surface of the first portion of the tab is substantially aligned with an inner surface of the flange.

8. A ram air fan assembly comprising:
  a fan housing including a flange having at least one tab including a first portion extending generally perpendicularly from the flange, a second portion extending generally parallel to the flange, and a notch formed by an inclined surface and a curved surface at an intersection between the first portion and the second portion, the notch being positioned adjacent an end of the motor, wherein the second portion is elongated and extends 0.020 inches (0.0508 centimeters) beyond a front surface of the first portion; and
  a motor stator, the motor stator being positioned within the fan housing such that an end of the motor stator is located within the notch of the at least one tab, the second portion of the tab in a non-contact relationship with the motor stator.

9. The ram air fan assembly to claim 8, wherein the second portion of the tab adjacent the notch is a distance of 0.250 inches (0.635 centimeters) from a datum aligned with a bolt flange of the fan housing.

10. The ram air fan assembly according to claim 8, wherein the inclined surface of the notch extends at an angle of at least 45 degrees from the front surface of the first portion of the tab.

11. The ram air fan assembly according to claim 8, wherein the curved surface has a radius of 0.020 inches (0.0508 centimeters).

12. The ram air fan assembly according to claim 8, wherein the distance that the inclined surface extends perpendicular to the front surface of the first portion is 0.035 inches±0.005 inches (0.089 centimeters±0.0127 centimeters).

13. The ram air fan assembly according to claim 8, wherein the first portion of the tab is integrally formed with the flange.

14. The ram air fan assembly according to claim 8, wherein the front surface of the first portion of the tab is substantially aligned with an inner surface of the flange.

15. The ram air fan assembly according to claim 8, wherein the fan housing includes 4 tabs spaced equidistantly about a circumference of the flange.

* * * * *